(12) United States Patent
Sakazaki et al.

(10) Patent No.: US 10,208,799 B2
(45) Date of Patent: Feb. 19, 2019

(54) BEARING APPARATUS AND METHOD FOR FEEDING LUBRICANT TO BEARING

(71) Applicant: JTEKT CORPORATION, Osaka-shi, Osaka (JP)

(72) Inventors: Tsukasa Sakazaki, Kizugawa (JP); Yoshimichi Higashiyama, Kashihara (JP); Masami Naka, Yamatokoriyama (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/414,069

(22) Filed: Jan. 24, 2017

(65) Prior Publication Data

US 2017/0219011 A1    Aug. 3, 2017

(30) Foreign Application Priority Data

Jan. 29, 2016    (JP) .................................. 2016-015333

(51) Int. Cl.
*F16C 33/66*    (2006.01)
*F16C 41/00*    (2006.01)

(52) U.S. Cl.
CPC .......... *F16C 33/6674* (2013.01); *F16C 41/00* (2013.01); *F16C 2233/00* (2013.01)

(58) Field of Classification Search
CPC  F16C 33/6674; F16C 33/664; F16C 33/6681; F16C 41/00; F16C 2233/00
See application file for complete search history.

(56) References Cited

U.S. PATENT DOCUMENTS

| | | | | |
|---|---|---|---|---|
| 2007/0071382 A1* | 3/2007 | Suzuki | ................ | F16C 33/6674 384/462 |
| 2008/0069488 A1* | 3/2008 | Ueno | .................... | F16C 19/163 384/470 |
| 2008/0080801 A1* | 4/2008 | Suzuki | ................ | F16C 33/6674 384/470 |
| 2008/0112661 A1* | 5/2008 | Suzuki | ................ | F16C 33/3856 384/473 |
| 2008/0121465 A1* | 5/2008 | Suzuki | ................. | B23Q 11/123 184/6.26 |
| 2009/0148087 A1* | 6/2009 | Suzuki | ................ | F16C 33/3806 384/462 |

(Continued)

FOREIGN PATENT DOCUMENTS

JP    2013-060999 A    4/2013
JP    2013-083335 A    5/2013

*Primary Examiner* — Alan B Waits
(74) *Attorney, Agent, or Firm* — Oliff PLC (57) ABSTRACT

A bearing apparatus includes a lubrication unit and a sensor to sense the temperature of the lubricant in the lubrication unit. The lubrication unit has a pump having a storage portion in which the lubricant is stored and a piezoelectric body that is deformed by an applied voltage, the pump enabling the lubricant in the storage portion to be discharged into the annular space by reducing the volume of the storage portion in conjunction with the deformation of the piezoelectric body, the pump also enabling the lubricant to be sucked into the storage portion to refill the storage portion with the lubricant by increasing the volume of the storage portion, and a control unit that performs control by outputting a control signal allowing the speed of change in the volume of the storage portion to depend on the temperature of the lubricant.

6 Claims, 9 Drawing Sheets

(56) References Cited

U.S. PATENT DOCUMENTS

| | | | |
|---|---|---|---|
| 2009/0152050 A1* | 6/2009 | Hattori | F16C 33/6674 184/6.4 |
| 2012/0132303 A1* | 5/2012 | Conley | F16N 7/14 137/565.17 |
| 2014/0248015 A1* | 9/2014 | Yamamoto | F16C 33/664 384/471 |
| 2014/0341490 A1* | 11/2014 | Ito | F16C 33/6607 384/471 |
| 2015/0260185 A1* | 9/2015 | Buergy | F04C 2/084 417/43 |
| 2016/0025137 A1* | 1/2016 | Hasama | F16C 33/6651 384/448 |
| 2016/0025138 A1* | 1/2016 | Watanabe | F16C 33/6655 384/448 |
| 2016/0025141 A1* | 1/2016 | Tanimoto | F16C 33/6651 384/473 |
| 2016/0084313 A1* | 3/2016 | Oomoto | F16C 33/6674 384/471 |
| 2016/0123634 A1* | 5/2016 | Smith | F16H 57/0413 165/287 |
| 2016/0158718 A1* | 6/2016 | Straitiff | B01F 13/10 366/108 |
| 2016/0333937 A1* | 11/2016 | Mizutani | F16C 33/6659 |
| 2017/0197857 A1* | 7/2017 | Whitener | B02C 18/0092 |
| 2017/0241307 A9* | 8/2017 | Borek | F01M 1/16 |

* cited by examiner

BEARING APPARATUS AND METHOD FOR FEEDING LUBRICANT TO BEARING

INCORPORATION BY REFERENCE

The disclosure of Japanese Patent Application No. 2016-015333 filed on Jan. 29, 2016 including the specification, drawings and abstract, is incorporated herein by reference in its entirety.

BACKGROUND OF THE INVENTION

1. Field of the Invention

The invention relates to a bearing apparatus and a method for feeding lubricant to a bearing, and in particular, to a bearing apparatus equipped with a mechanism configured to feed lubricant to a bearing and a method for feeding lubricant in the apparatus.

2. Description of the Related Art

Japanese Patent Application Publication No. 2013-60999 (JP 2013-60999 A) and Japanese Patent Application Publication No. 2013-83335 (JP 2013-83335 A) propose bearing apparatuses in which a bearing is equipped integrally with a unit configured to feed lubricant to the bearing. In such a bearing apparatus, lubricant is stored in the unit so that a specified amount of lubricant is fed to the bearing at a specified timing, for example, by a pump included in the unit.

The bearing apparatus equipped with the unit configured to feed lubricant to the bearing needs supply of lubricant stored in the unit. Thus, for enhanced maintainability of the bearing apparatus, keeping the frequency of supply of lubricant to the unit low is effective. An example of measures for keeping the frequency of supply of lubricant low is to set the amount of lubricant discharged from the unit and fed to the bearing to an ultratrace flow rate lower than a picoliter-scale flow rate.

The viscosity of oil is affected by temperature, and thus, a unit ambient temperature may affect the velocity of discharge of lubricant from the unit and the amount of lubricant discharged. Specifically, when the lubricant temperature is low, the viscosity tends to increase, leading to a reduced discharge velocity of the lubricant. As a result, the lubricant may fail to be fed to a designed position inside the bearing. When the lubricant temperature is low, the amount of lubricant discharged tends to be reduced. This may prevent a designed amount of lubricant from being fed to the bearing. In particular, a decrease in the amount of lubricant discharged from the unit makes the adverse effect of the ambient temperature more serious.

SUMMARY OF THE INVENTION

An object of the invention is to provide a bearing apparatus equipped with a mechanism configured to feed lubricant to a bearing which apparatus enables the lubricant to be stably fed to the bearing regardless of a change in the temperature of the lubricant, and a method for feeding lubricant in the bearing apparatus.

A bearing apparatus in an aspect of the invention includes a bearing portion having an inner ring, an outer ring, and a plurality of rolling elements interposed between the inner ring and the outer ring, a lubrication unit provided adjacent to an annular space in an axial direction between the inner ring and the outer ring to enable lubricant to be fed into the annular space, and a sensor configured to sense a temperature of the lubricant stored in the lubrication unit. The lubrication unit has a pump having a storage portion in which the lubricant is stored and a piezoelectric body that is deformed by an applied voltage, the pump enabling the lubricant in the storage portion to be discharged into the annular space by reducing a volume of the storage portion in conjunction with deformation of the piezoelectric body, the pump also enabling the lubricant to be sucked into the storage portion to refill the storage portion with the lubricant by increasing the volume of the storage portion; and a control unit that performs control by outputting a control signal, to the piezoelectric body, allowing a speed of change in the volume of the storage portion to depend on a temperature of the lubricant so as to reduce a fluctuation in an amount of lubricant fed into the annular space.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A preferred embodiment will be described below with reference to the drawings. The same parts and components are hereinafter denoted by the same reference numerals. Those parts and components have the same names and functions. Therefore, those parts and components will not repeatedly be described.

Figure 1:
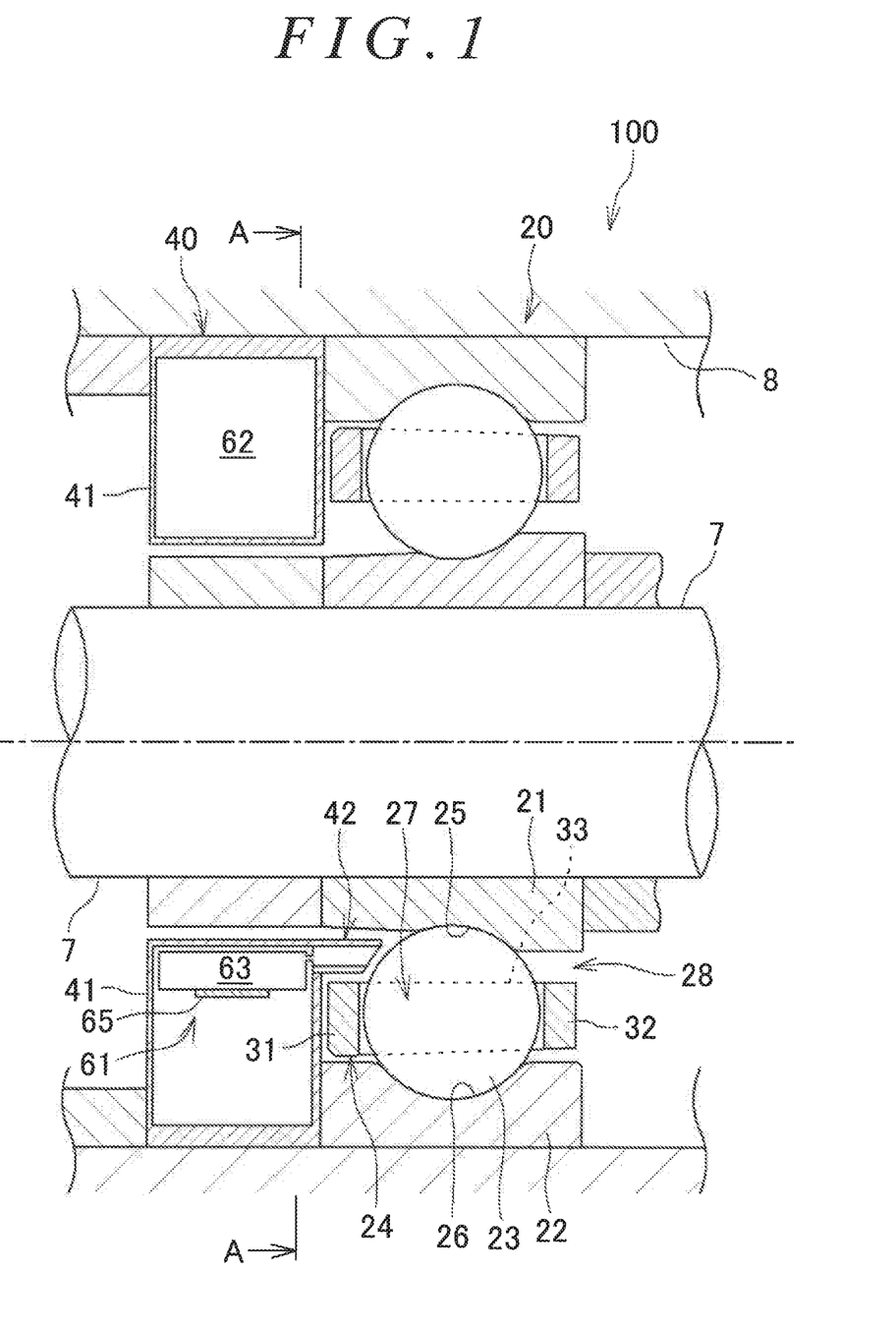
FIG. 1 is a sectional view of a bearing apparatus according to an embodiment which view is taken along a plane including a center line of a shaft.
Figure 2:
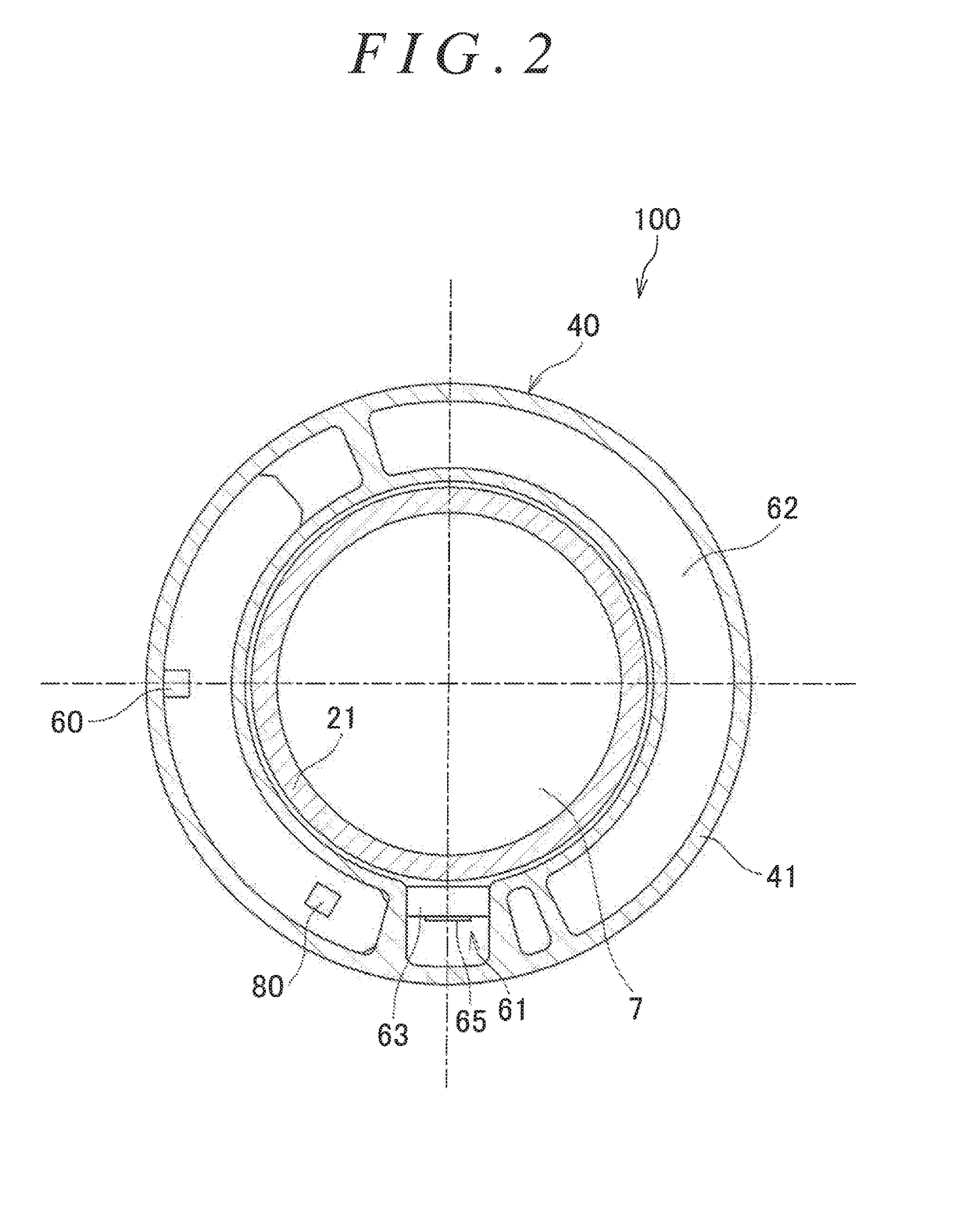
FIG. 2 is a sectional view of the bearing apparatus taken at an A-A position in FIG. 1.

FIG. 1 is a sectional view of a bearing apparatus 100 according to the present embodiment taken along a plane including a center line of a shaft. FIG. 2 is a sectional view of the bearing apparatus 100 as viewed in an axial direction; the sectional view is taken at an A-A position as indicated by arrows. As seen in FIG. 1 and FIG. 2, the bearing apparatus 100 includes a bearing main body 20, a lubrication unit 40, a sensor 60, and a control unit 80. The bearing apparatus 100 according to the present embodiment is housed in a bearing housing 8 to support a main spindle (shaft 7) of a machine tool so as to make the main spindle (shaft 7) rotatable.

The bearing main body 20 has an inner ring 21, an outer ring 22, a plurality of rolling elements 23, and an annular cage 24. The cage 24 holds the rolling elements 23. The inner ring 21 is a cylindrical member externally fitted over the shaft 7. On an outer periphery of the inner ring 21, a raceway groove (hereinafter referred to as an inner-ring raceway groove 25) is formed. The outer ring 22 is a cylindrical member fixed to an inner peripheral surface of a bearing housing 8. On an inner periphery of the outer ring 22, a raceway groove (hereinafter referred to as an outer-ring raceway groove 26) is formed. The inner ring 21 and the outer ring 22 are concentrically arranged. An annular space 28 is formed between the concentrically arranged inner ring 21 and outer ring 22. In the present embodiment, the inner ring 21 rotates with the shaft 7 with respect to the outer ring 22.

The rolling elements 23 are interposed in the annular space 28 between the inner ring 21 and the outer ring 22 and roll along the inner-ring raceway groove 25 and the outer-ring raceway groove 26.

The cage 24 is provided in the annular space 28. The cage 24 is an annular member having a plurality of pockets 27 formed at regular intervals along a circumferential direction so as to hold the respective rolling elements 23. The can 24 has a pair of annular portions 31, 32 and a plurality of cage bars 33. The annular portions 31, 32 are provided on the opposite sides of the rolling elements 23 in the axial direction. The cage bars 33 couple the annular portions 31, 32 together. The cage bars 33 are provided at intervals in the circumferential direction. Each of the pockets 27 is an area enclosed by the annular portions 31, 32 and two cage bars 33 adjacent to each other in the circumferential direction. One rolling element 23 is housed in each of the pockets 27. Consequently, the cage 24 can hold the rolling elements 23 in juxtaposition in the circumferential direction.

The lubrication unit 40 is provided adjacent to the annular space 28 of the bearing main body 20 on a first side in the axial direction. The lubrication unit 40 enables lubricant to be fed into the annular space 28. As seen in FIG. 2, the lubrication unit 40 has a case 41 and an extension portion 42. The extension portion 42 extends in the axial direction from the case 41.

In a space inside the case 41 included in the lubrication unit 40, a tank 62 configured to store lubricant (oil) and a pump 61 are provided.

The pump 61 has a storage portion 63, a diaphragm 64 (FIG. 3), a piezoelectric body 65, and a mechanism that applies a voltage to the piezoelectric body 65 and that is not depicted in the drawings. The storage portion 63 stores lubricant. The piezoelectric body 65 is arranged in contact with the diaphragm 64 and driven (deformed) by an applied voltage. The volume of the storage portion 63 of the pump 61 varies along with the deformation of the diaphragm 64, which is deformed as a result of driving of the piezoelectric body 65.

The volume of the storage portion 63 decreases in conjunction with the deformation of the diaphragm 64, which is deformed as a result of driving of the piezoelectric body 65. Consequently, a slight amount of lubricant in the storage portion 63 is discharged into the annular space 28 through the extension portion 42. The amount of lubricant discharged from the storage portion 63 and fed into the annular space 28 is an ultratrace flow rate that is, for example, lower than a picoliter-scale flow rate. Since the volume of the storage portion 63 increases in conjunction with the deformation of the piezoelectric body 65, the pump 61 sucks the lubricant from the tank 62 and refills the storage portion 63 with the lubricant.

As seen in FIG. 2, the sensor 60 configured to sense temperature and the control unit 80 are provided in a space inside the case 41. The control unit 80 is connected to a mechanism (not shown) that applies a voltage to the piezoelectric body 65. The control unit 80 performs control by outputting, to the mechanism, a control signal allowing the piezoelectric body 65 to be driven. Specifically, the control unit 80 outputs, as control signals, signals indicating a voltage to be applied to the piezoelectric body 65 and the time to apply the voltage. Therefore, the pump 61 performs a lubrication operation in accordance with the control by the control unit 80.

The sensor 60 is used to sense the temperature of the lubricant stored in the tank 62. For example, the sensor 60 senses the temperature in the case 41. Alternatively, for example, the sensor 60 may be provided in the tank 62 to sense the temperature of the lubricant stored in the tank 62. The sensor 60 is connected to the control unit 80 to input a sense signal indicative of the sensed temperature to the control unit 80. The control unit 80 can acquire the temperature of the lubricant based on the sense signal from the sensor 60.

The control unit 80 performs a control by outputting a control signal allowing the piezoelectric body 65 to be driven (deformed) such that the amount of change in the volume of the storage portion 63 per unit time varies according to the temperature of the lubricant. Consequently, the lubrication operation by the pump 61 is controlled based on the detection signal from the sensor 60.

Figure 3:
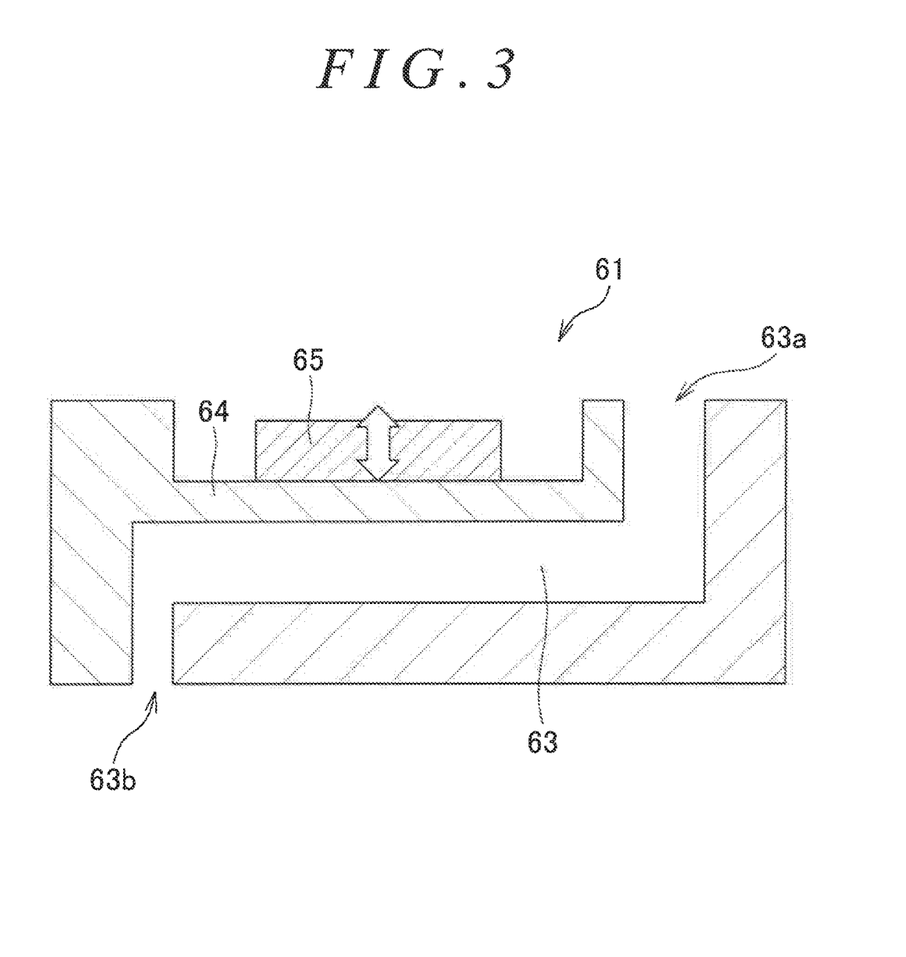
FIG. 3 is a schematic diagram illustrating a configuration of a pump included in the bearing apparatus.

FIG. 3 is a schematic diagram illustrating a configuration of the pump 61. The pump 61 is a diaphragm pump. Specifically, as seen in FIG. 3, the pump 61 has an opening 63a, an opening 63b, and a diaphragm 64. The opening 63a penetrates the pump 61 from the storage portion 63 toward the tank 62. The opening 63b penetrates the pump 61 from the storage portion 63 toward the extension portion 42. The diaphragm 64 forms the storage portion 63. The opening 63a allows the lubricant to pass from the tank 62 toward the storage portion 63. The opening 63b allows the lubricant to pass from the storage portion 63 toward the extension portion 42. The piezoelectric body 65 is provided adjacent to the diaphragm 64 and driven to deform the diaphragm 64.

When the storage portion 63 is refilled with the lubricant from the tank 62, a voltage is applied to the piezoelectric body 65, which is thus driven to deform the diaphragm 64. Thus, the volume of the storage portion 63 increases. As a result, the lubricant in the tank 62 is sucked through the opening 63a. When the lubricant is discharged from the storage portion 63 and fed into the annular space 28, the voltage applied to the piezoelectric body 65 decreases to deform the diaphragm 64. Thus, the volume of the storage portion 63 decreases. As a result, the lubricant stored in the storage portion 63 is discharged into the annular space 28 through the opening 63b. For the lubrication operation by the pump 61, the control unit 80 repeats the above-described control.

Figure 4:
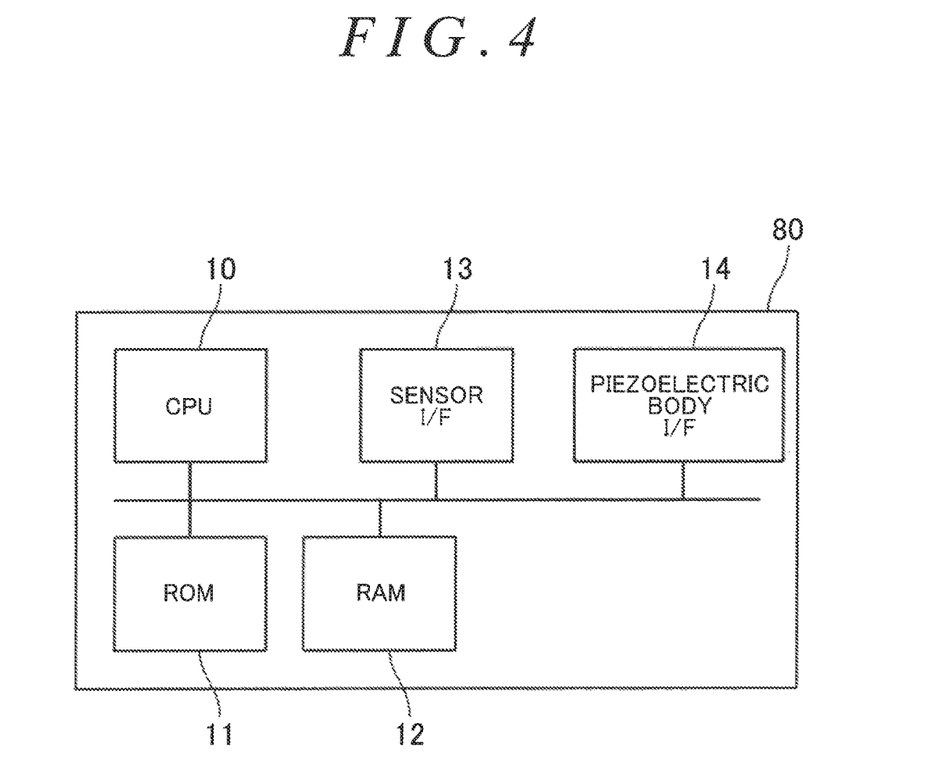
FIG. 4 is a block diagram illustrating an example of an apparatus configuration of a control unit included in the bearing apparatus.

FIG. 4 is a block diagram illustrating an example of an apparatus configuration of the control unit 80. The control unit 80 is, for example, a single large scale integrated circuit (LSI) also referred to as a microcomputer. As seen in FIG. 4, the control unit 80 includes a central processing unit (CPU) 10, a read only memory (ROM) 11, a random access memory (RAM) 12, a sensor I/F 13, and a piezoelectric body I/F 14. The CPU 10 controls the whole apparatus. The ROM 11 stores a program executed by the CPU 10. The RAM 12 serves as a working area when the CPU 10 executes a program, or stores various data. The sensor I/F 13 is an interface (I/F) that allows for communication with the sensor 60. The piezoelectric body I/F 14 is an interface that allows for communication with the piezoelectric body 65 and the like.

The viscosity of the lubricant is affected by temperature. Specifically, the viscosity of the lubricant increases as the temperature decreases. This increases the resistance offered by the lubricant when the lubricant is sucked into or discharged from the storage portion 63. Therefore, when the temperature decreases below a designed set temperature, the amount of lubricant sucked into or discharged from the storage portion 63 may decrease below a value expected to be obtained when the temperature of the lubricant is at the set temperature. In other words, when the temperature of the lubricant is lower than the set temperature, the lubricant may fail to be stably fed. In particular, in the bearing apparatus 100, a slight amount of lubricant is fed into the annular space 28 by the pump 61. Thus, an increased viscosity of the lubricant may prevent the lubricant from being sucked into or discharged from the storage portion 63. Thus, in the bearing apparatus 100 according to the present embodiment, the lubrication operation is controlled based on the temperature of the lubricant.

Figure 5A:
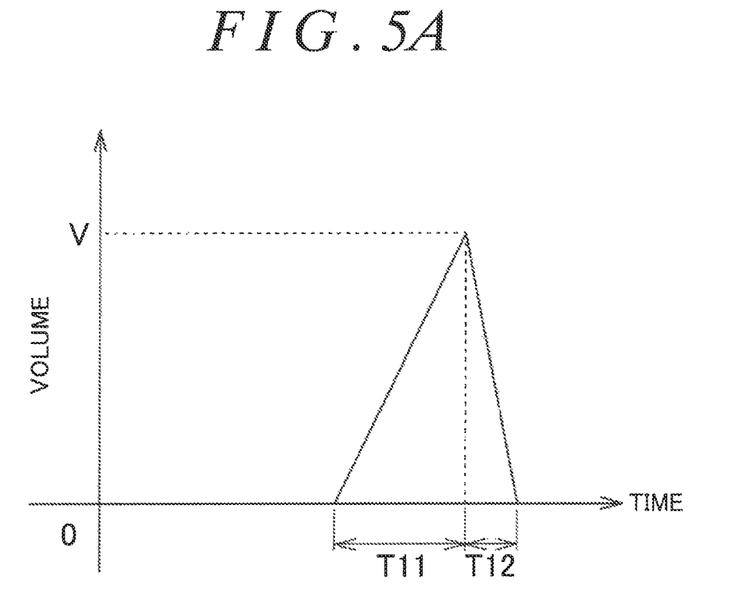
FIGS. 5A and 5B are diagrams illustrating a control of a lubrication operation at a set temperature in the bearing apparatus.
Figure 5B:
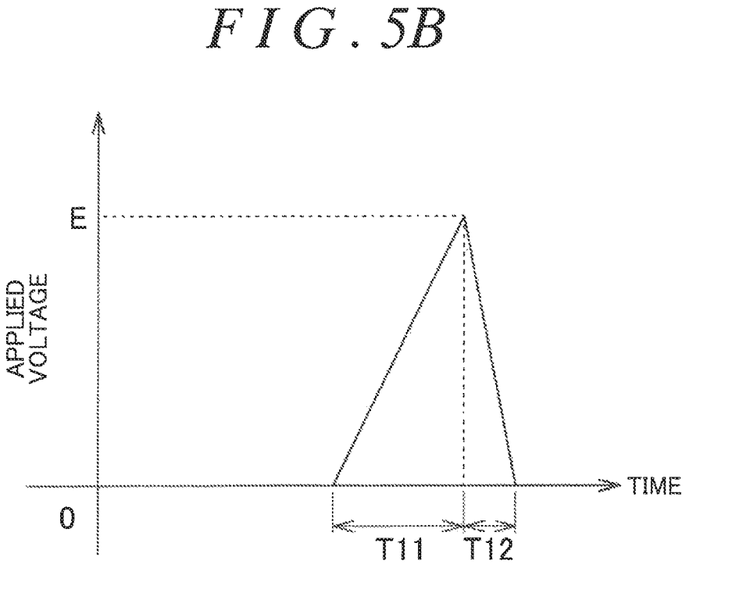
Figure 6A:
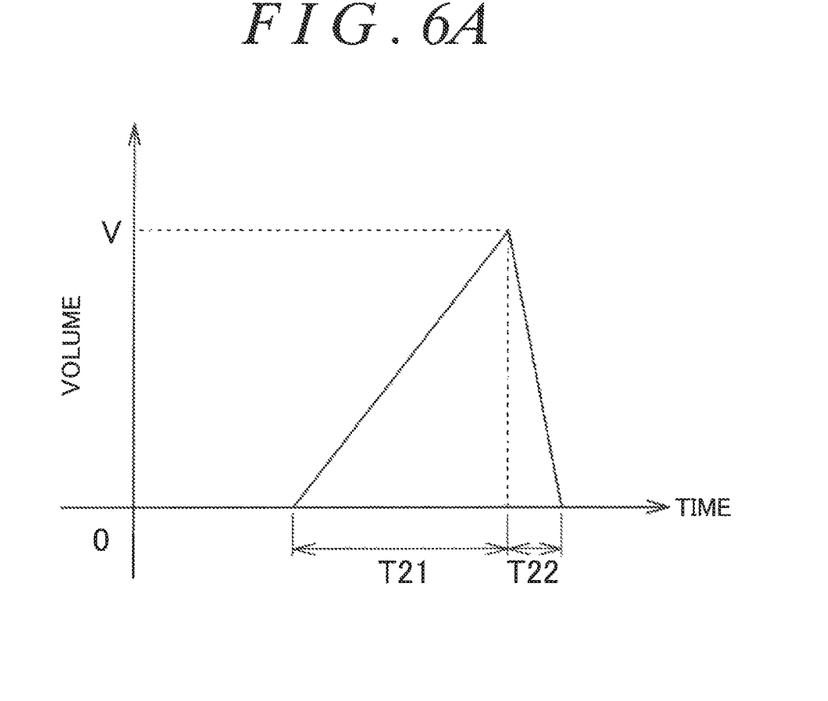
FIGS. 6A and 6B are diagrams illustrating a control of a lubrication operation at a temperature lower than the set temperature in the bearing apparatus.
Figure 6B:
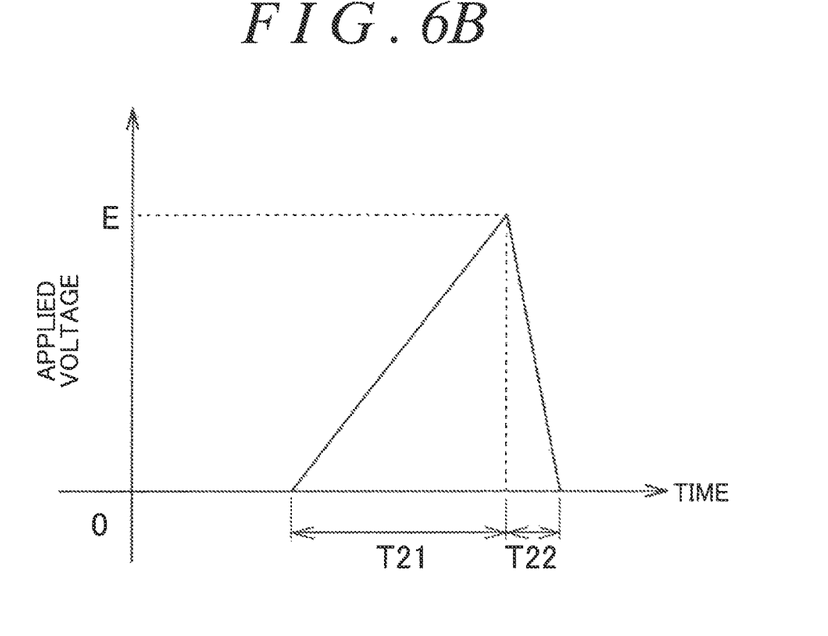

FIGS. 5A and 5B and FIGS. 6A and 6B are diagrams illustrating the control of the lubrication operation in the bearing apparatus 100. FIGS. 5A and 5B are diagrams illustrating the control of the lubrication operation performed at the set temperature (the temperature higher than a low temperature). FIGS. 6A and 6B are diagrams illustrating the control of the lubrication operation performed at the low temperature, which is lower than the set temperature. FIG. 5A and FIG. 6A are diagrams illustrating a temporal variation in the volume of the storage portion 63 during a single lubrication operation. FIG. 5B and FIG. 6B are diagrams illustrating a temporal variation in a voltage applied to the piezoelectric body 65. The single lubrication operation involves an operation of refilling the storage portion 63 with the lubricant by sucking the lubricant from the tank 62 into the storage portion 63 and an operation of feeding the lubricant into the annular space 28 by discharging the lubricant from the storage portion 63.

The control unit 80 for the bearing apparatus 100 applies a pre-specified voltage to the piezoelectric body 65 during the operation of refilling the storage portion 63 with the lubricant. Consequently, the piezoelectric body 65 is driven to curve the diaphragm 64 upward to increase the volume of the storage portion 63. The control unit 80 reduces the voltage applied to the piezoelectric body 65 to a pre-specified voltage during the operation of feeding the lubricant from the storage portion 63 into the annular space 28. Consequently, the piezoelectric body 65 is driven to curve the diaphragm 64 downward to reduce the volume of the storage portion 63.

At this time, as illustrated in FIGS. 5A and 5B and FIGS. 6A and 6B, the control unit 80 controls the voltage applied to the piezoelectric body 65 such that the amount of change in the volume of the storage portion 63 per unit time depends on the temperature of the lubricant. The temperature of the lubricant is obtained based on the sense signal from the sensor 60. This will be described in detail by comparison between FIG. 5A and FIG. 6A. When the temperature of the lubricant decreases below the set temperature (FIG. 6A), the control unit 80 controls the voltage applied to the piezoelectric body 65 such that the amount of increase in the volume of the storage portion 63 per unit time during the operation of refilling the storage portion 63 with the lubricant is smaller than that obtained when the temperature of the lubricant is at the set value (FIG. 5A). At this time, as illustrated in FIG. 5B and FIG. 6B, the control unit 80 sets the amount of increase in voltage per unit time during application of the pre-specified voltage to the piezoelectric body 65 such that the amount is smaller than that obtained when the temperature of the lubricant is at the set value. In other words, the control unit 80 sets the application time for which the voltage is applied to the piezoelectric body 65 (T21) such that the application time is longer than that provided when the temperature of the lubricant is at the set value (T11) (T21>T11).

The operation of refilling the storage portion 63 with the lubricant by sucking the lubricant into the storage portion 63 is controlled as described above. This makes the speed of increase in the volume of the storage portion 63 lower than that obtained when the temperature of the lubricant is at the set value. Consequently, the period of time for which the lubricant is sucked into the storage portion 63 is increased, in other words, the suction speed decreases. Therefore, even when the viscosity of the lubricant becomes higher than that obtained when the temperature of the lubricant is at the set value, thus increasing the resistance offered by the lubricant when the lubricant is sucked into the storage portion 63, the storage portion 63 is refilled with a needed amount of lubricant. This allows a designed amount of lubricant to be stably discharged from the storage portion 63.

Preferably, when the temperature of the lubricant decreases below the set temperature, the control unit 80 controls the voltage applied to the piezoelectric body 65 so as to increase the amount of decrease in the volume of the storage portion 63 per unit time during the operation of feeding the lubricant from the storage portion 63 into the annular space 28. At this time, the control unit 80 sets the amount of decrease in the voltage applied to the piezoelectric body 65 per unit time needed to reduce the voltage down to the pre-specified value such that the amount is larger than the amount needed when the temperature of the lubricant is at the set value. In other words, the control unit 80 sets the amount of time needed to reduce the voltage applied to the piezoelectric body 65 down to the pre-specified value (T22) such that the amount of time is smaller than the amount of time needed when the temperature of the lubricant is at the set value (T12) (T22<T12).

The operation of feeding the lubricant by discharging the lubricant from the storage portion 63 is controlled as described above. This makes the speed of decrease in the volume of the storage portion 63 higher than that obtained when the temperature of the lubricant is at the set value. The amount of time for which the lubricant is discharged from the storage portion 63 decreases, in other words, the discharge speed increases. Therefore, even when the viscosity of the lubricant becomes higher than the viscosity obtained when the temperature of the lubricant is at the set value, thus increasing the resistance offered by the lubricant when the lubricant is discharged from the storage portion 63, a designed amount of lubricant is stably discharged from the storage portion 63.

Figure 7:
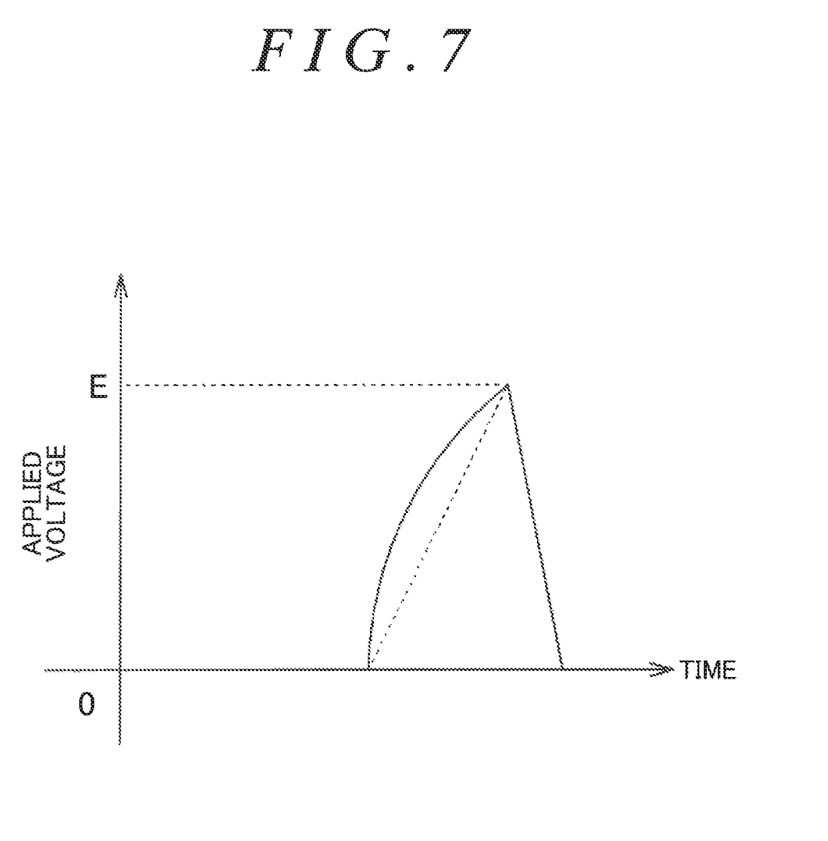
FIG. 7 is a diagram illustrating another example of the control of the lubrication operation.

FIGS. 5A and 5B and FIGS. 6A and 6B illustrate an example in which the control unit 80 linearly varies the voltage applied to the piezoelectric body 65 so as to linearly vary the speed of change in the volume of the storage portion 63. A linear variation in applied voltage allows the control by the control unit 80 to be facilitated. However, the control of the applied voltage by the control unit 80 is not limited to the linear variation in applied voltage. For example, as illustrated in FIG. 7, the control may be such that the applied voltage is nonlinearly varied with a hysteresis of the piezoelectric body 65 taken into account. Of course, the control of the applied voltage may be performed not only during the operation of refilling the storage portion 63 with the lubricant by sucking the lubricant into the storage portion 63 but also during the operation of feeding the lubricant into the annular space 28 by discharging the lubricant from the storage portion 63. Even during the latter operation, the control may be performed such that the applied voltage is nonlinearly varied.

Figure 8:
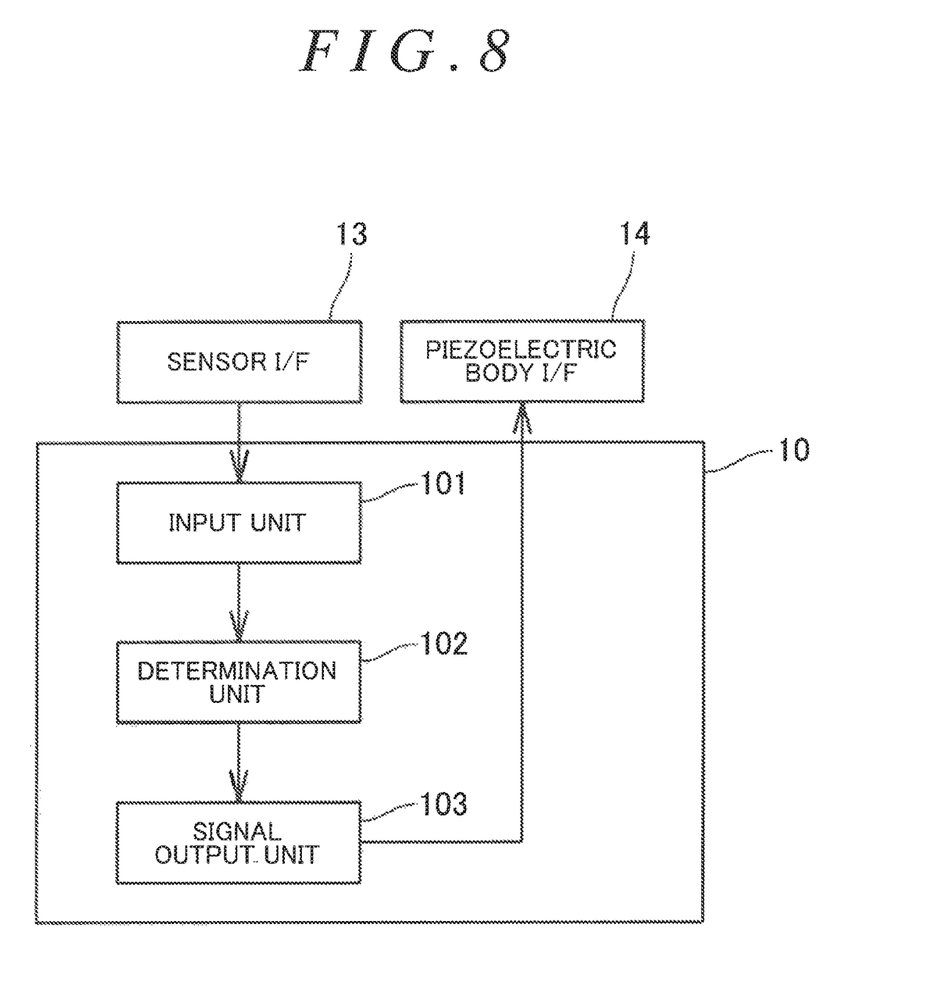
FIG. 8 is a block diagram illustrating an example of a functional configuration of the control unit.

FIG. 8 is a block diagram illustrating an example of a functional configuration of the control unit 80 that allows control of the above-described lubrication operation. The functions in FIG. 8 are implemented mainly by the CPU 10 included in the control unit 80 by reading programs stored in the ROM 11 onto the RAM 12 and executing the programs. However, at least some of the functions may be implemented by a dedicated electronic circuit or the like not depicted in the drawings.

As seen in FIG. 8, the CPU 10 of the control unit 80 includes an input unit 101, a determination unit 102, and a signal output unit 103. The input unit 101 accepts an input of information indicative of the temperature of the lubricant as the sense signal from the sensor 60. The determination unit 102 determines the application time for the piezoelectric body 65 based on the temperature of the lubricant. The signal output unit 103 outputs, to the piezoelectric body 65, a control signal serving to perform control by allowing the speed of change in the volume of the storage portion 63 to depend on the temperature of the lubricant, using the application time determined by the determination unit 102 for the piezoelectric body 65.

The determination unit 102 allows the speed of change in the volume of the storage portion 63 to depend on the temperature of the lubricant. To achieve this, the determination unit 102 determines the amount of change in voltage per unit time needed to set the voltage applied to the piezoelectric body 65 to a specified value, in other words, the time (application time) needed to change the voltage applied to the piezoelectric body 65 to the specified value. The determination unit 102 may pre-store a relationship between the temperature of the lubricant and the application time. For example, the determination unit 102 may store the amount of time for each temperature zone and determine the application time to be the amount of time associated with the temperature zone to which the sensed temperature of the lubricant belongs. Alternatively, the determination unit 102 may pre-store a relation expression between the temperature of the lubricant and the amount of time and calculate the application time by substituting the sensed temperature of the lubricant into the relation expression.

When the temperature of the lubricant is lower than the set temperature, the determination unit 102 determines the amount of time larger than the amount of time needed when the temperature of the lubricant is at the set value to be the application time needed to refill the storage portion 63 with the lubricant. Then, the amount of increase in the volume of the storage portion 63 per unit time while refilling the storage portion 63 with the lubricant is smaller than that obtained when the temperature of the lubricant is at the set value. Consequently, the suction period is extended, in other words, the suction speed decreases.

Preferably, when the temperature of the lubricant is lower than the set temperature, the determination unit 102 determines the amount of time smaller than the amount of time needed to reduce the applied voltage when the temperature of the lubricant is at the set value to be the amount of time needed to change the applied voltage when the lubricant is discharged from the storage portion 63. Then, the amount of decrease in the volume of the storage portion 63 per unit time while refilling the storage portion 63 with the lubricant is larger than that obtained when the temperature of the lubricant is at the set value. Consequently, the suction period is shortened, in other words, the discharge speed increases.

Figure 9:
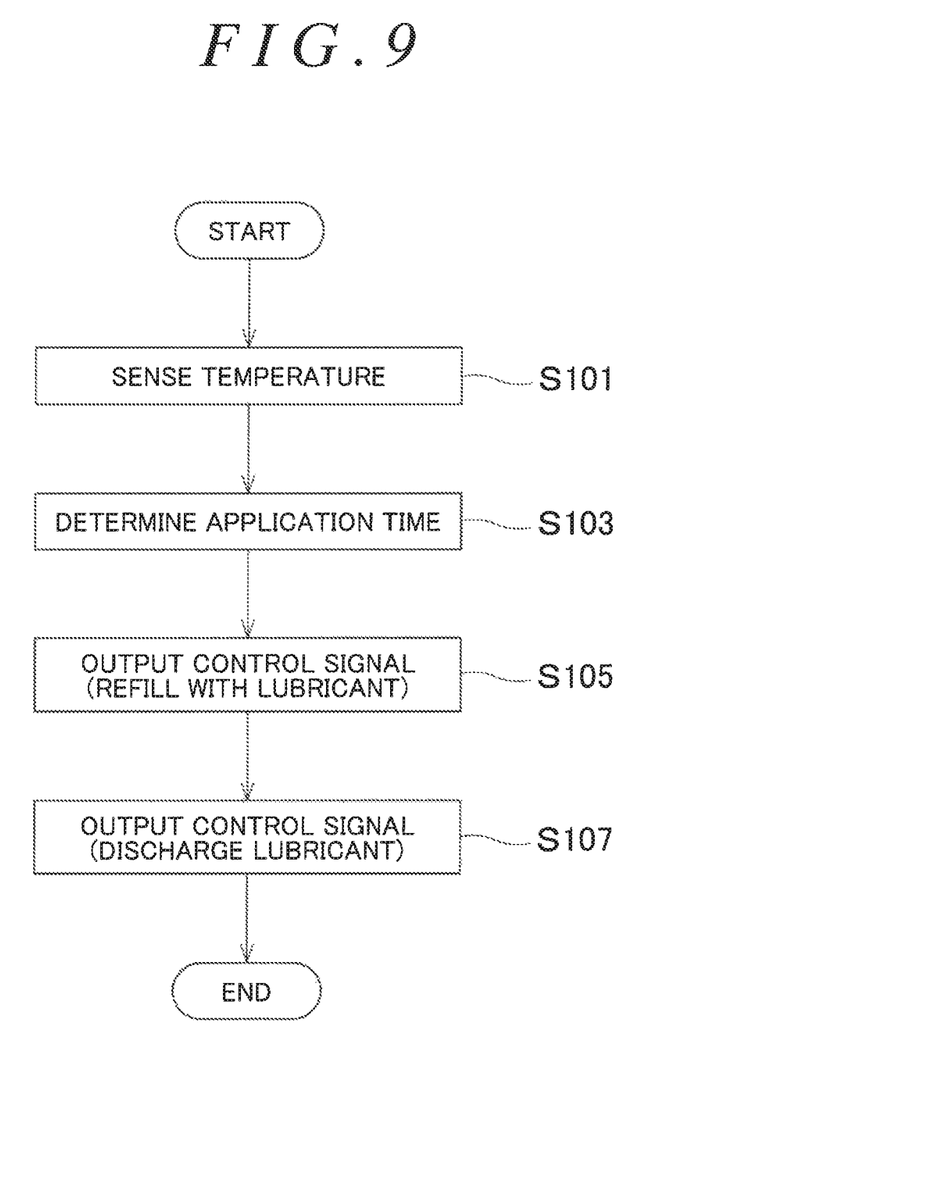
FIG. 9 is a flowchart illustrating a sequence of control executed by the control unit when the lubrication operation is performed in the bearing apparatus.

FIG. 9 is a flowchart illustrating a lubrication method in the bearing apparatus 100, in other words, a sequence of control executed by the control unit 80 when the lubrication operation is performed in the bearing apparatus 100. Operations illustrated in the flowchart in FIG. 9 are implemented by the CPU 10 of the control unit 80 by reading a relevant program stored in the ROM 11 onto the RAM 12 and executing the program to provide the functions in FIG. 8. The operations illustrated in the flowchart in FIG. 9 are started when the CPU 10 of the control unit 80 senses that a pre-specified timing to perform the lubrication operation has been reached. The timing to perform the lubrication operation is, for example, when a pre-specified period has passed since the last lubrication operation.

As seen in FIG. 9, when the timing to perform the lubrication operation is reached, the CPU 10 senses the temperature of the lubricant based on the sense signal from the sensor 60 (step S101). In step S101, when the temperature of the lubricant is sensed, the CPU 10 determines the application time for the piezoelectric body 65 based on the temperature (step S103). That is, in step S103, the CPU 10 determines the amount of time needed to increase the voltage applied to the piezoelectric body 65 up to the pre-specified value such that the speed of increase in the volume of the storage portion 63 during the operation of refilling the storage portion 63 with the lubricant depends on the temperature of the lubricant.

Upon determining the application time, the CPU 10 outputs, to the mechanism configured to output a voltage to the piezoelectric body 65, a control signal allowing the piezoelectric body 65 to be deformed such that the volume of the storage portion 63 increases at an increase speed depending on the temperature of the lubricant (step S105). In accordance with the control signal, the voltage applied to the piezoelectric body 65 increases to deform the piezoelectric body 65. In conjunction with the deformation, the volume of the storage portion 63 increases to allow the lubricant to be sucked into the storage portion 63, which is thus refilled with the lubricant.

Preferably, in step S103, the CPU 10 determines the amount of time needed to reduce the voltage applied to the piezoelectric body 65 down to the pre-specified voltage to be the amount of time needed to change the voltage applied to the piezoelectric body 65 such that the speed of decrease in the volume of the storage portion 63 during the operation of discharging the lubricant from the storage portion 63 depends on the temperature of the lubricant. The CPU 10 then outputs, to the mechanism configured to output a voltage to the piezoelectric body 65, a control signal allowing the piezoelectric body 65 to be deformed such that the volume of the storage portion 63 decreases at a decrease speed depending on the temperature of the lubricant (step S107). In accordance with the control signal, the voltage applied to the piezoelectric body 65 decreases to deform the piezoelectric body 65. In conjunction with the deformation, the volume of the storage portion 63 decreases to allow the lubricant to be discharged from the storage portion 63.

In the bearing apparatus 100 according to the present embodiment, the above-described control is performed during the lubrication operation. This suppresses a fluctuation in the amount of lubricant fed from the lubrication unit to the bearing which fluctuation results from a variation in temperature, thus allowing a set amount of lubricant to be stably fed regardless of a variation in temperature.

In particular, if the temperature of the lubricant is lower than the set temperature, the flow velocity of the lubricant decreases while refilling the storage portion 63 with the lubricant, with a resultant increased amount of time needed for the refilling. Thus, the storage portion 63 is refilled with a needed amount of lubricant with an increased viscosity. Consequently, even if the temperature of the lubricant is lower than the set temperature, the lubricant is stably fed.

Preferably, in the bearing apparatus 100, if the temperature of the lubricant is lower than the set temperature, the flow velocity of the lubricant increases when the lubricant is discharged from the storage portion 63. Thus, a needed amount of lubricant with an increased viscosity is discharged from the storage portion 63. Consequently, even if the temperature of the lubricant is lower than the set temperature, the lubricant is stably fed.

In the above description, an increased voltage applied to the piezoelectric body 65 increases the volume of the storage portion 63, whereas a reduced voltage applied to the piezoelectric body 65 reduces the volume of the storage portion 63. However, this relationship is only illustrative. For example, the relationship may be such that an increased voltage applied to the piezoelectric body 65 reduces the volume of the storage portion 63, whereas a reduced voltage applied to the piezoelectric body 65 increases the volume of the storage portion 63. In this case, the above-described control to increase and reduce the voltage applied to the piezoelectric body 65 is reversed.

The embodiment disclosed above is illustrative in every way and should be considered not to be restrictive. The scope of the invention is indicated by claims rather than by the above description and intended to embrace the claims and all variations within the meaning and range of equivalency.

The embodiment of the invention provides a bearing apparatus equipped with a mechanism configured to feed lubricant to a bearing which apparatus allows the lubricant to be stably fed to the bearing even with a variation in the temperature of the lubricant.

What is claimed is:

1. A bearing apparatus comprising:
    a bearing portion comprising an inner ring, an outer ring, and a plurality of rolling elements interposed between the inner ring and the outer ring;
    a lubrication unit provided adjacent to an annular space in an axial direction between the inner ring and the outer ring to enable lubricant to be fed into the annular space; and
    a sensor configured to sense a temperature of the lubricant stored in the lubrication unit, wherein
    the lubrication unit comprises:
        a pump comprising a storage portion in which the lubricant is stored and a piezoelectric body that is deformed by an applied voltage, the pump enabling the lubricant in the storage portion to be discharged into the annular space by reducing a volume of the storage portion in conjunction with deformation of the piezoelectric body, the pump also enabling the lubricant to be sucked into the storage portion to refill the storage portion with the lubricant by increasing the volume of the storage portion; and
        a control unit that performs control by outputting a control signal to control a voltage applied to the piezoelectric body, such that an amount of change in the volume of the storage portion per unit time depends on a temperature of the lubricant so as to reduce a fluctuation in an amount of lubricant fed into the annular space, and
    when the temperature of the lubricant decreases below a predetermined temperature, the control unit controls the voltage applied to the piezoelectric body so as to increase the amount of decrease in the volume of the storage portion per unit time during the discharging of the lubricant from the storage portion into the annular space.

2. The bearing apparatus according to claim 1, wherein the control unit outputs, to the piezoelectric body, a control signal allowing a speed of increase in the volume of the storage portion to be reduced as the temperature of the lubricant decreases.

3. The bearing apparatus according to claim 2, wherein the control unit outputs, to the piezoelectric body, a control signal allowing a speed of decrease in the volume of the storage portion to be increased as the temperature of the lubricant decreases.

4. The bearing apparatus according to claim 1, wherein when the temperature of the lubricant decreases below a predetermined temperature, the control unit controls the voltage applied to the piezoelectric body such that the amount of increase in the volume of the storage portion per unit time during the refilling of the storage portion with the lubricant is smaller than that obtained when the temperature of the lubricant is at a predetermined value.

5. The bearing apparatus according to claim 1, wherein when the temperature of the lubricant decreases below a predetermined temperature, the control unit controls the voltage by applying the voltage to the piezoelectric body for a longer amount of time than when the temperature of the lubricant is at the predetermined value.

6. The bearing apparatus according to claim 1, wherein when the temperature of the lubricant decreases below a predetermined temperature, the control unit controls the voltage by setting an amount of decrease in the voltage applied to the piezoelectric body per unit time needed to reduce the voltage down to a predetermined value such that the amount of the decrease in the voltage is larger than the amount needed when the temperature of the lubricant is at the predetermined temperature.

* * * * *